United States Patent
Bonanno et al.

(10) Patent No.: US 10,534,611 B2
(45) Date of Patent: *Jan. 14, 2020

(54) BRANCH PREDICTION USING MULTI-WAY PATTERN HISTORY TABLE (PHT) AND GLOBAL PATH VECTOR (GPV)

(71) Applicant: International Business Machines Corporation, Armonk, NY (US)

(72) Inventors: James J. Bonanno, Wappingers Falls, NY (US); Matthias D. Heizmann, Poughkeepsie, NY (US); Daniel Lipetz, Linden, NJ (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 596 days.

This patent is subject to a terminal disclaimer.

(21) Appl. No.: 14/448,030

(22) Filed: Jul. 31, 2014

(65) Prior Publication Data
US 2016/0034279 A1 Feb. 4, 2016

(51) Int. Cl.
*G06F 9/38* (2018.01)

(52) U.S. Cl.
CPC .................. *G06F 9/3806* (2013.01)

(58) Field of Classification Search
None
See application file for complete search history.

(56) References Cited

U.S. PATENT DOCUMENTS

| | | | |
|---|---|---|---|
| 5,574,871 A | 11/1996 | Hoyt et al. | |
| 5,935,241 A | 8/1999 | Shiell et al. | |
| 7,082,520 B2* | 7/2006 | Bonanno | G06F 9/3806 712/236 |
| 7,430,650 B1* | 9/2008 | Ross | G06F 12/0862 711/137 |
| 2003/0041230 A1* | 2/2003 | Rappoport | G06F 9/3848 712/238 |

(Continued)

OTHER PUBLICATIONS

J. Bonnano, et al., "Branch Prediction Using Multi-Way Pattern History Table (PHT) and Global Path Vector (GPV)," U.S. Appl. No. 14/528,214, filed Oct. 30, 2014.

(Continued)

*Primary Examiner* — George Giroux
(74) *Attorney, Agent, or Firm* — Cantor Colburn LLP; William Kinnaman (57) ABSTRACT

Embodiments relate to branch prediction using a pattern history table (PHT) that is indexed using a global path vector (GPV). An aspect includes receiving a search address by a branch prediction logic that is in communication with the PHT and the GPV. Another aspect includes starting with the search address, simultaneously determining a plurality of branch predictions by the branch prediction logic based on the PHT, wherein the plurality of branch predictions comprises one of: (i) at least one not taken prediction and a single taken prediction, and (ii) a plurality of not taken predictions. Another aspect includes updating the GPV by shifting an instruction identifier of a branch instruction associated with a taken prediction into the GPV, wherein the GPV is not updated based on any not taken prediction.

6 Claims, 8 Drawing Sheets

(56) References Cited

U.S. PATENT DOCUMENTS

| | | | | |
|---|---|---|---|---|
| 2004/0193843 | A1* | 9/2004 | Altshuler | G06F 9/3844 712/207 |
| 2006/0095750 | A1* | 5/2006 | Nye | G06F 9/3848 712/240 |
| 2006/0149951 | A1 | 7/2006 | Abernathy et al. | |
| 2006/0236080 | A1* | 10/2006 | Doing | G06F 9/3804 712/238 |
| 2007/0239974 | A1* | 10/2007 | Park | G06F 9/3806 712/238 |
| 2007/0288735 | A1 | 12/2007 | Vasekin et al. | |
| 2008/0046658 | A1* | 2/2008 | Goodman | G06F 12/0862 711/137 |
| 2008/0189533 | A1* | 8/2008 | Hayashi | G06F 9/3844 712/240 |
| 2009/0037709 | A1* | 2/2009 | Ishii | G06F 9/3848 712/240 |
| 2009/0125707 | A1* | 5/2009 | Olson | G06F 9/3806 712/240 |
| 2009/0198984 | A1* | 8/2009 | Loschke | G06F 9/3848 712/240 |
| 2010/0161951 | A1* | 6/2010 | Chiou | G06F 9/3806 712/240 |
| 2010/0169626 | A1* | 7/2010 | Wang | G06F 9/3806 712/239 |
| 2013/0332714 | A1* | 12/2013 | Bonanno | G06F 9/38 712/239 |
| 2014/0025932 | A1* | 1/2014 | Suzuki | G06F 9/3806 712/207 |
| 2015/0046691 | A1* | 2/2015 | Heil | G06F 9/3844 712/240 |

OTHER PUBLICATIONS

List of IBM Patents or Patent Applications Treated as Related; Oct. 30, 2014; pp. 1-2.

Anonymously, "Dual-Selector Voting Mechanism to Redude Aliasing Effects in Branch History Tables for Branch Predictions," http://ip.com/IPCOM/000219110D; Jun. 19, 2012; pp. 1-4.

IBM, "Method to Exclude Bad Patterns from a Pattern History Table Branch Predictor," An IP.com Prior Art Database Technical Disclosure; http://ip.com/IPCOM/000191968D; Jan. 19, 2010; pp. 1-5.

J. Lee, et al., "Analysis of Branch Prediction Strategies and Branch Target Buffer Design," IEEE Computer Society, Jan. 1984; pp. 1-44.

S. Mcfarling, "Combing Branch Predictors," WRL Technical Note TN-36; Jun. 1993; pp. 1-29.

A. Rustan, "Using Artificial Neural Networks to Improve Hardware Branch Predictors," IJCNN'99, International Joint Conference on Neural Networks. Proceedings (Cat No. 99CH36339); pp. 3419-3424; vol. 5, IEEE; 1999.

A. Seznec, "The L-TAGE Branch Predictor," Journal of Instruction-Level Parallelism 9 (2007) 1-13.

S. Wallace, et al., "Multiple Branch and Block Prediction," IEEE Copyright 1997; Published in the Proceedings of the Third International Symposium on High Performance Computer Architecture; Feb. 1-5, 1997 in San Antonio, TX, USA; pp. 1-11.

Nair; "Dynamic Path-Based Branch Correlation"; IEEE Proceedings of MICRO-28 (1995); 9 pages.

\* cited by examiner

BRANCH PREDICTION USING MULTI-WAY PATTERN HISTORY TABLE (PHT) AND GLOBAL PATH VECTOR (GPV)

BACKGROUND

The present invention relates generally to branch prediction in a processor pipeline, and more specifically, to branch prediction using a multi-way pattern history table (PHT) that is indexed using a global path vector (GPV).

Branch prediction is a performance-critical component of a pipelined high frequency processor. Branch prediction predicts the direction (i.e., taken versus not taken) and the target address of each taken branch instruction that is encountered in the pipeline. Branch prediction allows processing to continue along a branch's predicted path before resolution of the branch without having to wait for the outcome of the branch to be determined. However, a penalty is incurred if a branch is predicted incorrectly.

Branch prediction in a processor may be performed using a branch target buffer (BTB), which is a cache that stores branch and target information. Other structures, such as a branch history table (BHT), pattern history table (PHT), and multiple target table (MTT), can be included to store additional information that is used for branch direction and target prediction. Any such structures may be accessed in parallel with the BTB with the same latency as the BTB. The branch prediction structures can be accessed at different stages in a processor pipeline. For example, the branch prediction structures may be accessed asynchronously from instruction fetching in a lookahead manner, in parallel with instruction fetching, or after decoding instructions and determining the presence of branch instructions.

A BHT or PHT may use saturating counters as a state machine to predict the direction of branches. A BHT may be indexed and tagged based on instruction address of each branch in the BHT. A PHT may be indexed as a function of instruction address and global pattern history and may contain instruction address tags and/or pattern history tags. The global pattern history may represent the direction (taken or not-taken) of previous branches. Each PHT entry may be, for example, a 2-bit saturating counter. The PHT attempts to learn the dominant behavior of a branch when encountered with a particular global history pattern, or multiple branches with associated history patterns that map to the same table entry, and predict their direction.

SUMMARY

Embodiments include a method, system, and computer program product for branch prediction using a multi-way pattern history table (PHT) that is indexed using a global path vector (GPV). An aspect includes receiving a search address by a branch prediction logic that is in communication with the PHT and the GPV. Another aspect includes starting with the search address, simultaneously determining a plurality of branch predictions by the branch prediction logic based on the PHT, wherein the plurality of branch predictions comprises one of: (i) at least one not taken prediction and a single taken prediction, and (ii) a plurality of not taken predictions. Another aspect includes updating the GPV by shifting an instruction identifier of a branch instruction associated with a taken prediction into the GPV, wherein the GPV is not updated based on any not taken prediction.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of a multi-way PHT indexed by a GPV for branch prediction are provided with exemplary embodiments being discussed below in detail. A GPV comprising a global history based on the instruction addresses of taken branches is maintained. The PHT may be indexed as a function of the history of instruction addresses of previous taken branches using the GPV. A PHT that is indexed by a GPV enables relatively high throughput branch prediction, and is able to predict multiple branches simultaneously. For example, in an N-way PHT, up to N predictions may be made simultaneously by the PHT; for example, N−1 not taken predictions and 1 taken prediction. The GPV is not updated for not taken branches, but is updated after each taken branch: speculatively at prediction time to generate the PHT read index, and nonspeculatively at completion time to generate the PHT write index. Therefore, a new PHT index is only required upon predicting or resolving a taken branch. Multiple copies of the GPV may be maintained in some embodiments; a first for prediction time, and a second for completion time. Updating the GPV only for taken branches in combination with a multi-way PHT allows multiple not taken predictions and one taken prediction to be made simultaneously from the N entries read from a single PHT index. Furthermore, updating the GPV only for taken branches is an update rule that is applicable at both prediction and completion time. Various embodiments may be used in conjunction with asynchronous lookahead branch prediction, as well as branch prediction that is synchronous with instruction fetching or decoding. A PHT indexed by a GPV may be used in conjunction with a tagged BTB in some embodiments.

In embodiments that include a BTB with a multi-way PHT, the BTB and PHT are read in parallel to make branch predictions. For asynchronous lookahead branch prediction, a search instruction address is used to access the BTB and the PHT. Branches located at or after the input search address are predicted simultaneously until the first predicted taken branch is encountered. If there is no predicted taken branch, branch searching continues sequentially in a pipelined manner on subsequent cycles. If there is a predicted taken branch, searching is redirected to the target address of the predicted taken branch. For synchronous branch prediction with instruction fetching or decoding, the instruction fetch address or decode address may be used as the search address for the BTB and PHT. In some embodiments, the PHT and the BTB are both tagged, and the BTB contains a BHT predictor. In such an embodiment, PHT entries are written upon incorrect BHT predictions, and PHT entries are used when the PHT entries include a tag match against the search address; otherwise, the BHT prediction from the BTB is used.

In some embodiments, the BTB may be omitted, and, in such embodiments, prediction is performed based on the PHT synchronously with instruction fetch or decoding. In such an embodiment, the associativity of the PHT may be set based on the maximum number of instructions possible in the instruction fetch/decode block of the pipeline. Alternatively, the associativity of the PHT may be independent of the number of instructions being fetched and decoded, and the PHT may contain address tags to provide association between PHT entries and instruction address.

Figure 1:
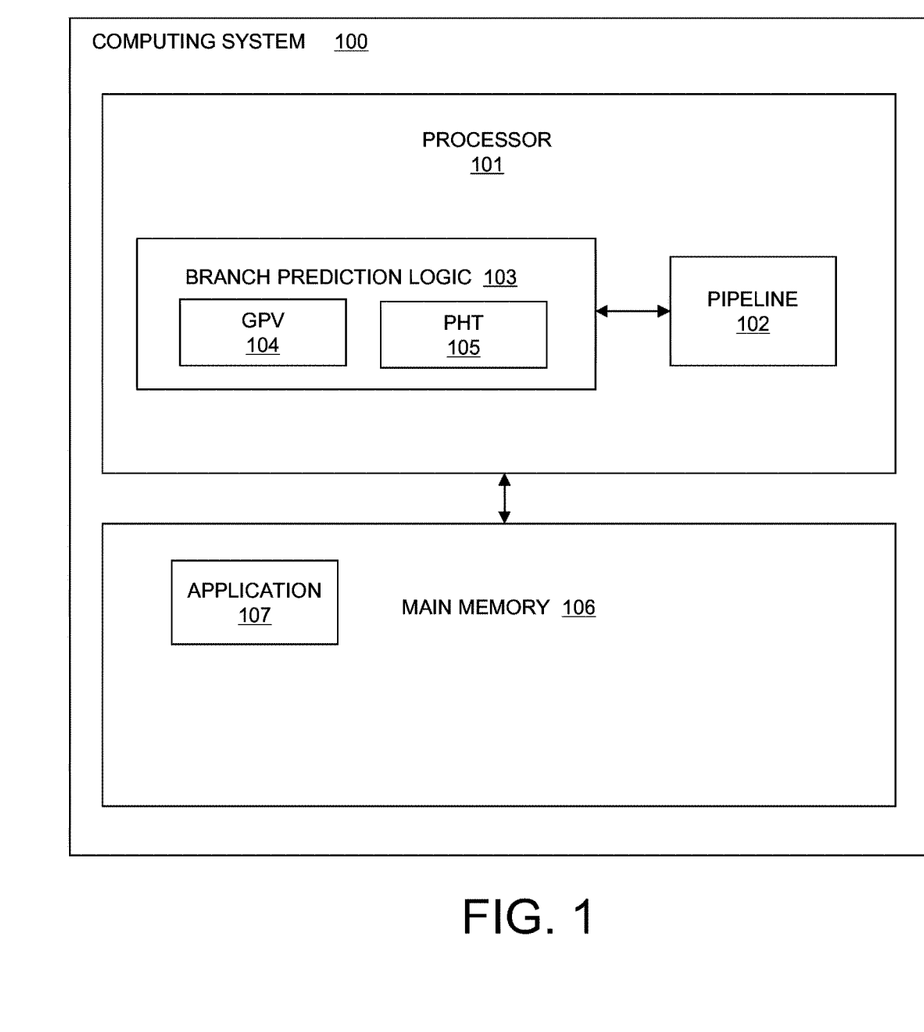
FIG. 1 depicts a computer system with a branch prediction logic in accordance with an embodiment.

Turning now to FIG. 1, an embodiment of a computer system 100 is generally shown. Computer system 100 includes a processor 101 that is in communication with a main memory 106. The processor 101 executes applications such as application 107 that are stored in main memory 106 by processing instructions using pipeline 102. Pipeline 102 fetches, decodes, and completes instructions. During the execution of such applications, branch instructions may be encountered. Branch prediction logic 103 is used to predict the direction (i.e., taken or not taken) of branch instructions at prediction time, which is before completion time and allows fetching and decoding to continue in the predicted direction of the branch. The branch prediction logic 103 is updated at completion time, when the direction and target address of the branch is known. Branch prediction logic 103 includes PHT 105 that is indexed using a GPV 104, and is described in further detail below with respect to FIGS. 2-7.

Figure 2:
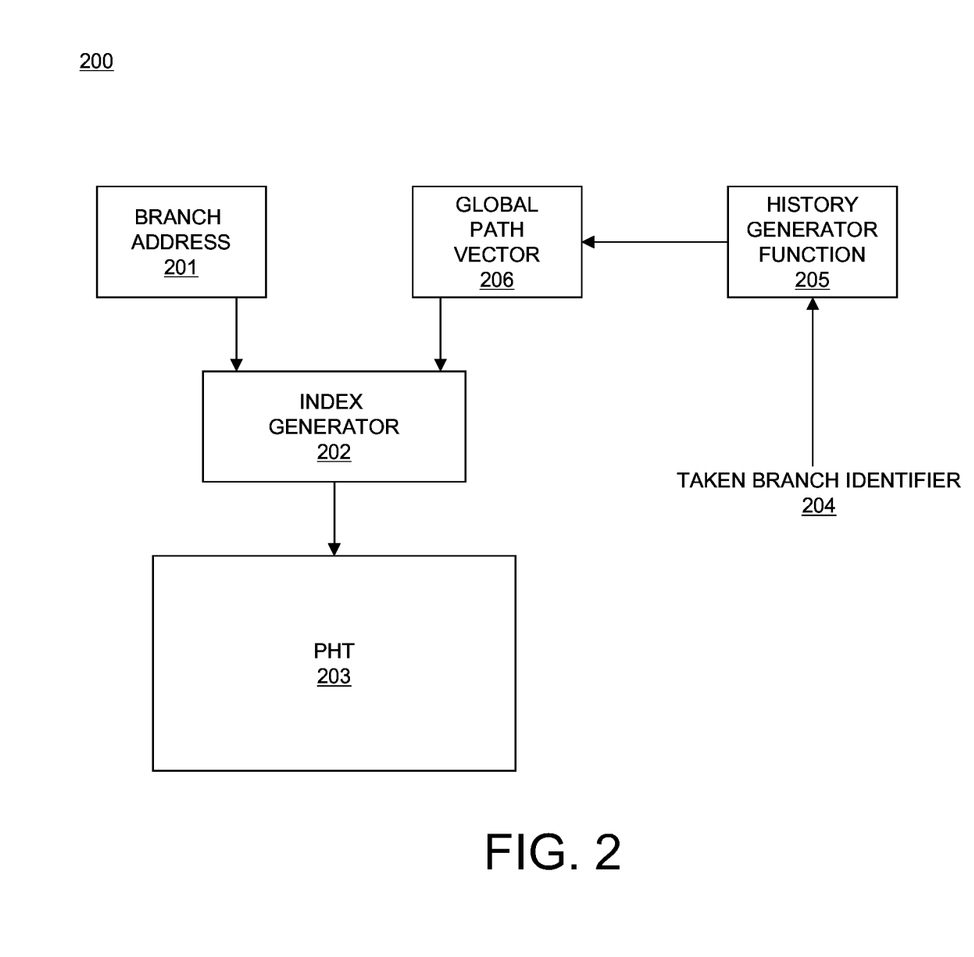
FIG. 2 depicts a multi-way PHT indexed by a GPV for branch prediction in accordance with an embodiment.

FIG. 2 illustrates an embodiment of a branch prediction logic 200, which may comprise branch prediction logic 103 of FIG. 1. Branch prediction logic 200 includes a PHT 203 (which may correspond to PHT 105 of FIG. 1) that is indexed by a GPV 206 (which may correspond to GPV 104 of FIG. 1). When a taken branch is encountered in the pipeline 102 during execution of an application, an identifier of the taken branch, which may comprise, for example, the instruction address or the target address of the taken branch, is input to history generator function 205. History generator function 205 reduces the number of bits in the taken branch identifier. The reduced number of bits may be smaller than the number of bits in the GPV 206. The output of the history generator function 205 is then shifted into the GPV 206; older bits in the GPV 206 will be shifted out as new bits are shifted in. The branch address 201 of the taken branch and the contents of the GPV are input into index generator 202, which generates an index for the PHT 203. The index generator 202 may generate an index for the PHT 203 either at branch prediction time for reading the PHT 203 or at update time for writing the PHT 203. The index generator 202 may be any function that combines bits from the GPV 206 with the branch address 201, and may not use all of the bits of the branch address 201 or of the GPV 206 in some embodiments.

The instruction address of each taken branch goes through the history generator function 205 before being shifted into the GPV 206. In some embodiments, the history generator function 205 may be a hash function, such as exclusive OR (XOR) logic, to reduce the number of bits in the instruction address. For example, a 64 bit instruction address may be hashed down to 2 bits using a history generator function 205 comprising two 32-way XOR functions. The result of the history generator function 205 is shifted into the GPV 206. Multiple speculative copies of the GPV 206 may be maintained in the branch prediction logic 200 in some embodiments, each for use at a particular time, for example, at prediction time, at completion time, and for branches within the pipeline to allow restoration when there is an incorrect prediction.

In some embodiments, a PHT that is indexed by a GPV may be used in conjunction with a BTB. In either asynchronous or synchronous branch prediction, the associativity of the PHT and the BTB may be independent (i.e., an any-to-any configuration), or may be linked in a one-to-one configuration. In an embodiment comprising a one-to-one configuration, the BTB and PHT each have the same associativity N, and each way in the BTB is linked to the same way in the PHT. When a PHT entry is written for a corresponding branch in the BTB, the entry is written to the same way in the PHT. When making branch predictions, each way in the PHT is only used to influence the direction prediction of the branch predicted from the same way in the BTB. In an embodiment comprising an any-to-any configuration, the associativity of an N-way BTB is not linked to an M-way PHT. Any of the M accessed PHT entries may be used to influence the direction prediction of any of the N accessed BTB entries. The BTB and PHT may each have independent replacement algorithms, such as least recently used (LRU).

Figure 3:
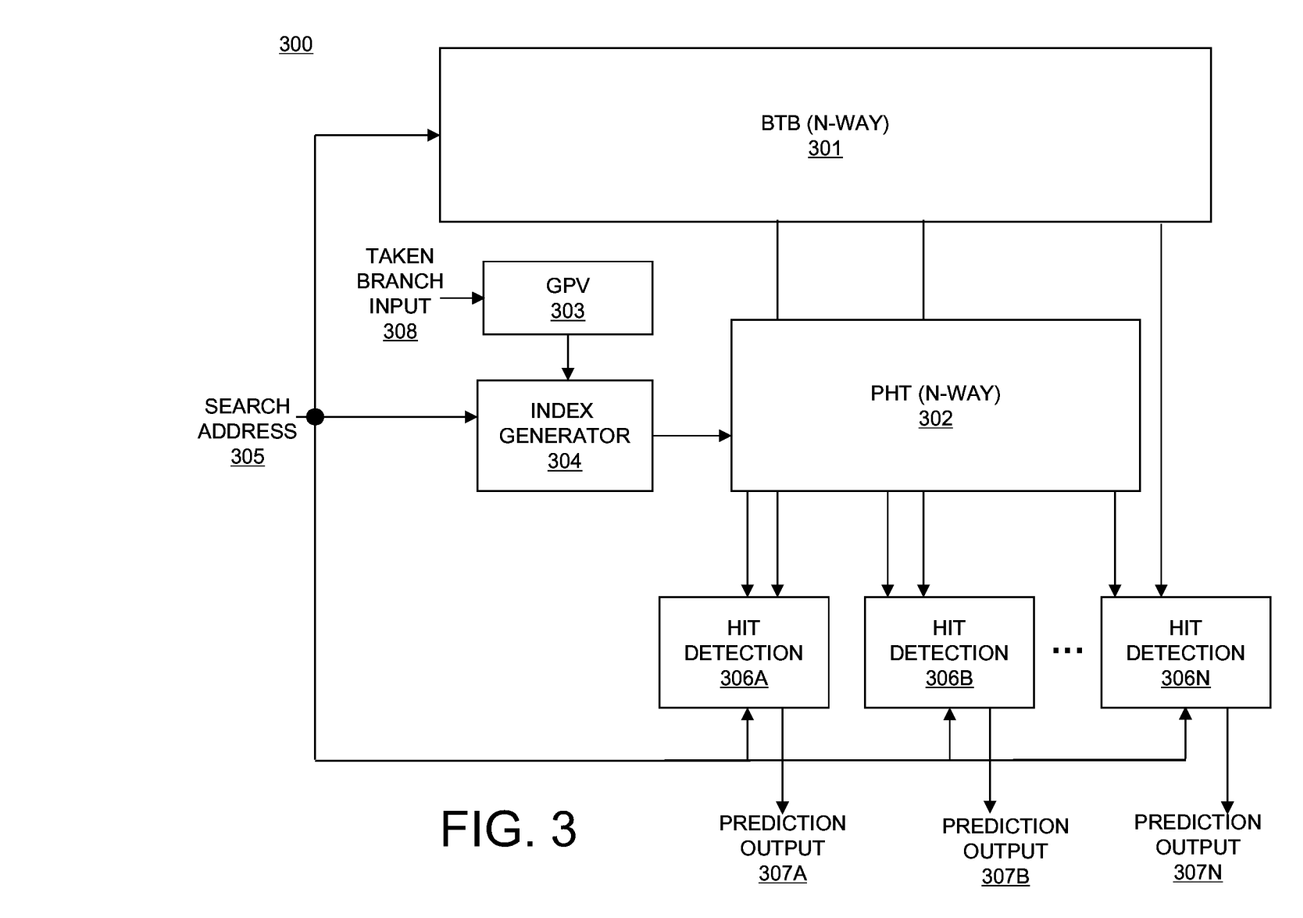
FIG. 3 depicts a multi-way PHT indexed by a GPV in conjunction with a BTB for branch prediction in accordance with an embodiment.

FIG. 3 illustrates an embodiment of a branch prediction logic 300, which may correspond to branch prediction logic 103 of FIG. 1. Branch prediction logic 300 includes a BTB 301 and a PHT 302 in a one-to-one configuration, i.e., each of the BTB 301 and the PHT 302 are N-way. Branch prediction logic 300 receives a search address 305 from a pipeline such as pipeline 102 of FIG. 1, and predictions are made sequentially starting with the search address 305. The search address 305 is input into BTB 301, index generator 304, and hit detection modules 306A-N. A subset of the bits of the search address 305 may be used to index into the BTB 301. This subset of bits of the search address 305 may not include the least significant bits of the address, allowing the BTB row corresponding to the index to represent branches within a range of addresses. For instance, if the 5 least significant bits of the address are not used as part of the index, then each row of the BTB covers $2^5$, or 32 bytes of address space. Branch address tags may be included in each BTB entry to indicate parts of the branch's instruction address that are not included in the BTB index. Index generator 304 receives the search address 305 and the value held in the GPV 303, and generates an index to be used for reading from or writing to the PHT 302. Each way in the BTB 301 is associated with a corresponding respective way in the PHT 302 and a corresponding respective hit detection module of hit detection modules 306A-N. Each hit detection module 306A-N receives the search address 305 and an input from the hit detection module's respective way in each of the BTB 301 and PHT 302, and outputs a branch prediction on respective prediction output 307A-N based on these inputs. The set of predictions that are determined by hit detection modules 306A-N may comprise a plurality of not taken predictions and no taken prediction; a single taken prediction; or a plurality of not taken predictions and a single taken prediction. Up to N−1 not taken predictions, and 1 taken prediction, may be made simultaneously by hit detection modules 306A-N; these predictions are provided to the processor pipeline. Up to N not taken predictions may be made simultaneously by hit detection modules 306A-N if there is no taken prediction. When a taken branch is encountered, an identifier of the taken branch is shifted into the GPV 303 via taken branch input 308, which may comprise a history generator function such as history generator function 205 of FIG. 2. The target address, which may be retrieved from the BTB 301 in some embodiments, of the taken branch is also input to the branch prediction logic 300 as search address 305, and predictions continue sequentially from the target address.

Figure 4:
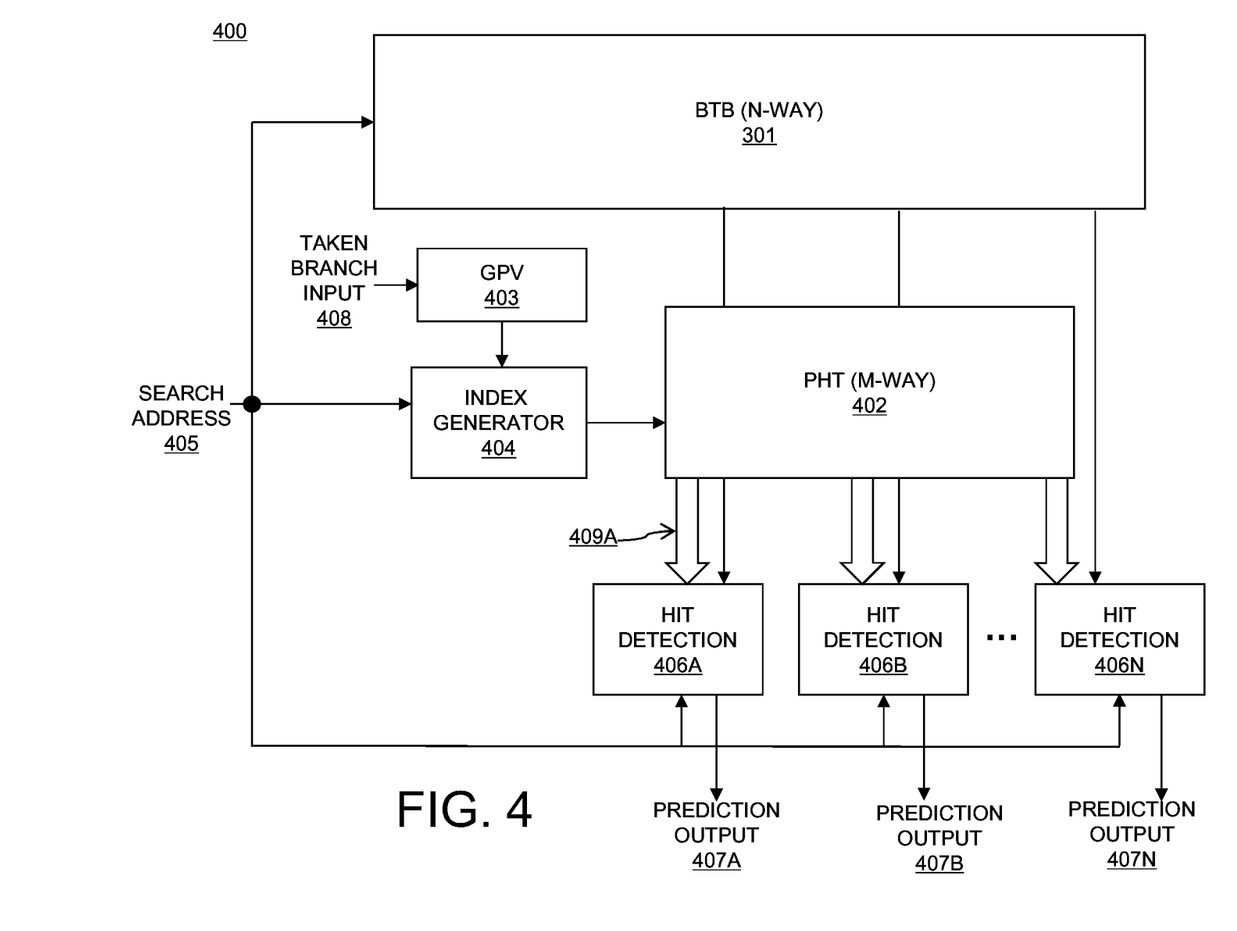
FIG. 4 depicts a multi-way PHT indexed by a GPV in conjunction with a BTB for branch prediction in accordance with an embodiment.

FIG. 4 illustrates an embodiment of a branch prediction logic 400, which may correspond to branch prediction logic 103 of FIG. 1. Branch prediction logic 400 includes a BTB 401 and a PHT 402 in an any-to-any configuration, i.e., the BTB 401 is N-way, and the PHT 402 is M-way, wherein N may not be equal to M. Branch prediction logic 400 receives a search address 405 from a pipeline such as pipeline 102 of FIG. 1, and predictions are made sequentially starting with the search address 405. The search address 405 is input into BTB 401, index generator 404, and hit detection modules 406A-N. Index generator 404 receives the search address 405 and the value held in the GPV 403, and generates an index to be used for reading from or writing to the PHT 402. Each way in the BTB 401 is associated with a corresponding respective hit detection module of hit detection modules 406A-N. Each hit detection module 406A-N receives the search address 405 and an input from the hit detection module's respective way in the BTB 401, and also has M inputs (as illustrated by M-way input 409A) corresponding to each of the M ways in the PHT 402. Each hit detection module 406A-N outputs a branch prediction based on these inputs on respective prediction output 407A-N. Branch address tags or global path tags within each PHT entry may be used by each hit detection module 406A-N to determine which PHT entry or entries to use to make a prediction. Such tags can be compared against the search address 405, the GPV 403, or tag bits coming from the entry from BTB 301. Up to N not taken predictions, or up to N−1 not taken predictions and 1 taken prediction, may be made simultaneously by hit detection modules 406A-N; these predictions are provided to the processor pipeline. When a taken branch is encountered, an identifier of the taken branch is shifted into the GPV 403 via taken branch input 408, which may comprise a history generator function such as history generator function 205 of FIG. 2. The target address, which may be retrieved from the BTB 401 in some embodiments, of the taken branch is also input to the branch prediction logic 400 as search address 405, and predictions continue sequentially from the target address.

Figure 5:
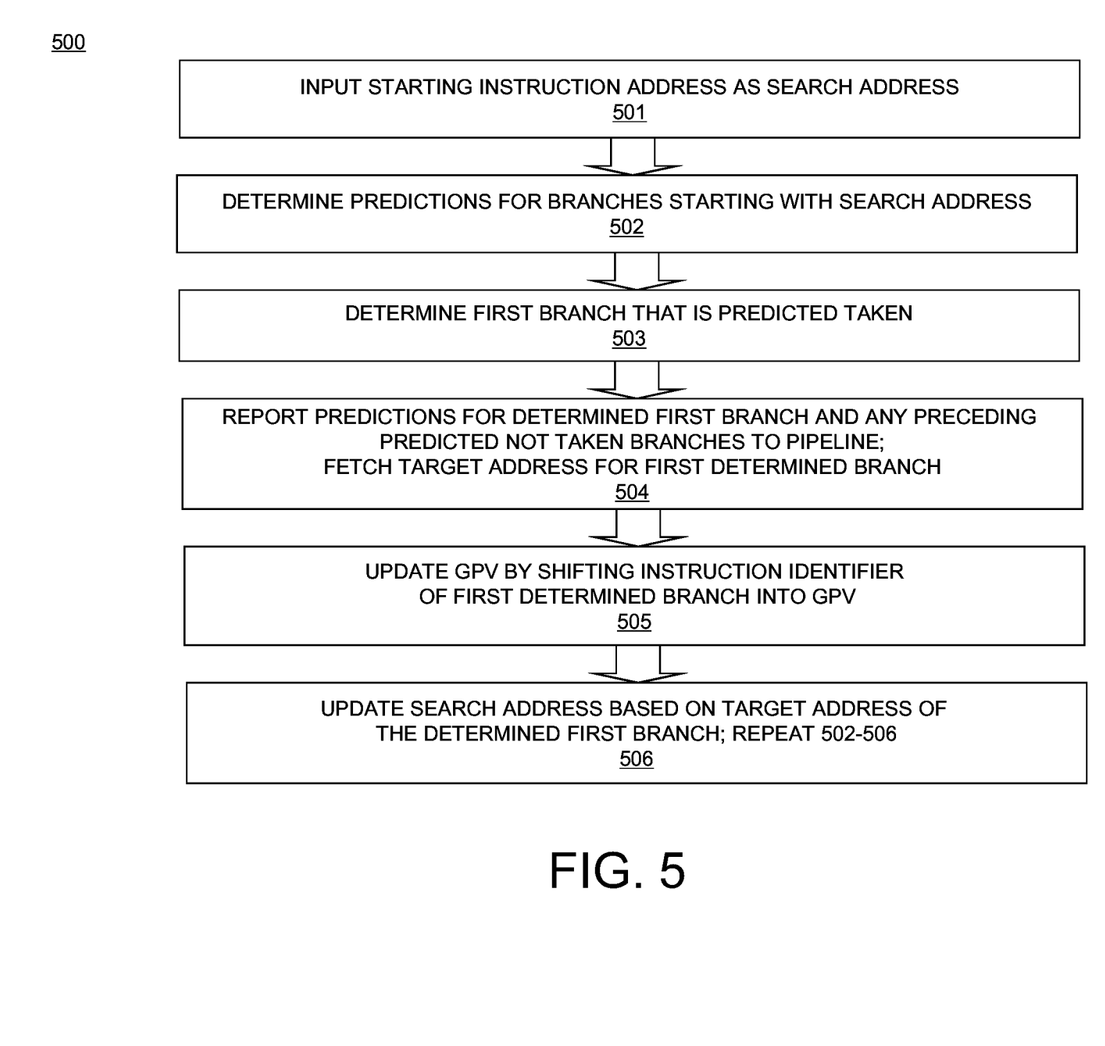
FIG. 5 depicts a process flow for branch prediction using a multi-way PHT indexed by a GPV in accordance with an embodiment.

FIG. 5 depicts an embodiment of a method 500 for branch prediction using a PHT indexed by a GPV. In block 501, the address of a starting instruction is input as a search address (305/405) to a branch prediction logic from the pipeline. Then, in block 502, predictions are made sequentially, starting with the search address, for any branches that are encountered by N hit detection modules (306A-N/406A-N). The predictions may be made in any appropriate manner based on reading from the PHT (302/402) using a GPV (303/403) as an index. In block 503, a first branch in the sequential instructions that is predicted as taken is encountered. In block 504, any not taken predictions for any branches that are sequentially before the determined first branch, and the prediction of taken for the determined first branch, are reported to the pipeline (102), and the target address is fetched for the determined first branch. Up to N−1 not taken predictions and 1 taken prediction may be made simultaneously. In some iterations of method 500, only a single taken prediction may be made, with no not taken predictions. In block 505, an identifier of the determined first branch is shifted into the GPV (303/403) via a taken branch input (308/408); only the identifiers of branches that are predicted taken are shifted into the GPV (303/403). Lastly, in block 506, the target address of the determined first branch is input into the branch prediction logic as the search address (305/405), and blocks 502-506 are repeated with the updated search address.

In some embodiments of method 500, the predictions made at block 502 may include up to N not taken predictions, and no taken prediction. In such an embodiment, block 503 is skipped, the up to N not taken predictions are reported to the pipeline in block 504, the GPV is not updated in block 505, and the search address is updated in block 506 to be equal to a next address after the last not taken prediction that was made in block 502. In further embodiments of method 500, no predictions may be made; in such an embodiment, the search address may be updated until one or more predictions are made.

Figure 6:
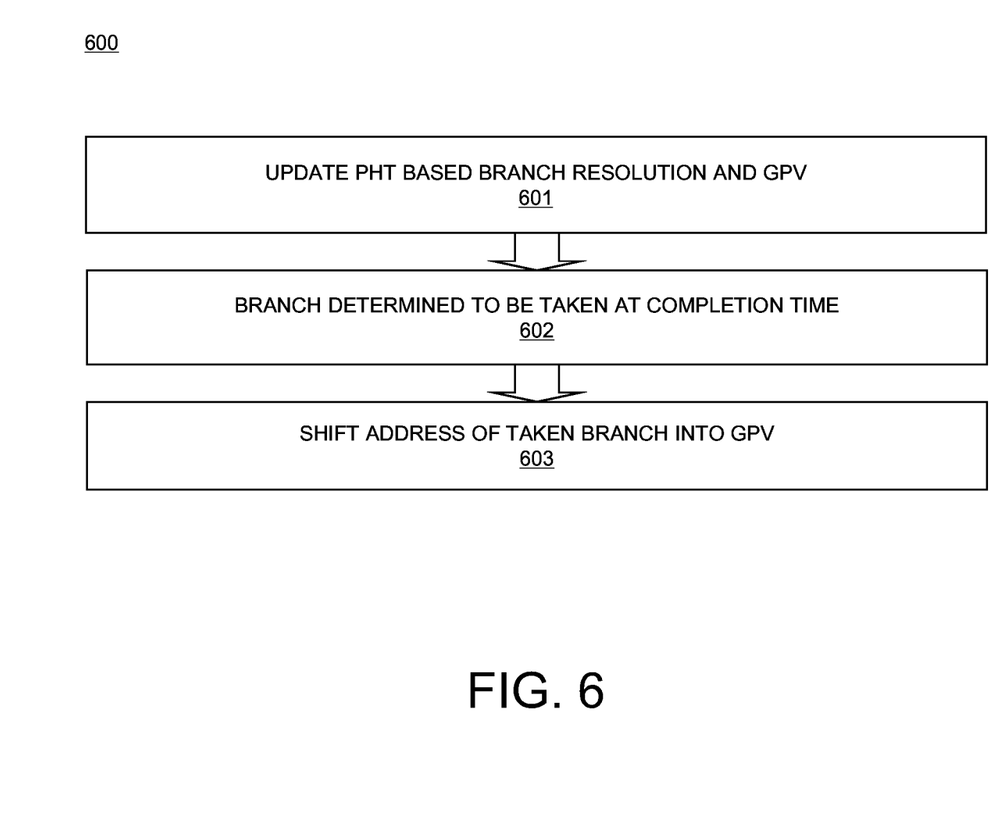
FIG. 6 depicts a process flow for branch completion using a multi-way PHT indexed by a GPV in accordance with an embodiment.

FIG. 6 an embodiment of a method 600 for branch completion using a PHT indexed by a GPV. First, in block 601, the PHT (203) is updated based on an index that is determined by an index generator 202 based on a branch address (201) of a resolved branch and the GPV (206). The PHT is updated for a branch based on the predicted direction of the resolved branch, the actual outcome of the branch at completion, and whether or not the PHT provided the prediction. The update rules for whether to update the PHT and how to update the PHT state may differ among embodiments. For example, in an embodiment comprising a PHT without a BTB, the PHT may be updated if it the PHT made a weak prediction, or if the PHT made a prediction that was wrong. In an embodiment including a PHT with a BTB, there may be two cases in which the PHT is updated: if the PHT was used to make the prediction, the PHT may be updated if the PHT made a weak prediction or was wrong; or, if the BTB made was used to make the prediction, the PHT may be updated if the BTB was wrong. Then, in block 602, a branch is determined to be taken at completion time in the pipeline (102). Lastly, in block 603, an identifier (204) of the taken branch is shifted into the GPV (206) via a history generator function (205). The GPV is not updated for not taken branches. In some embodiments, separate copies of the GPV may be maintained for branch completion versus branch prediction. The PHT will be updated based on the updated GPV in a subsequent iteration of method 600.

Figure 7:
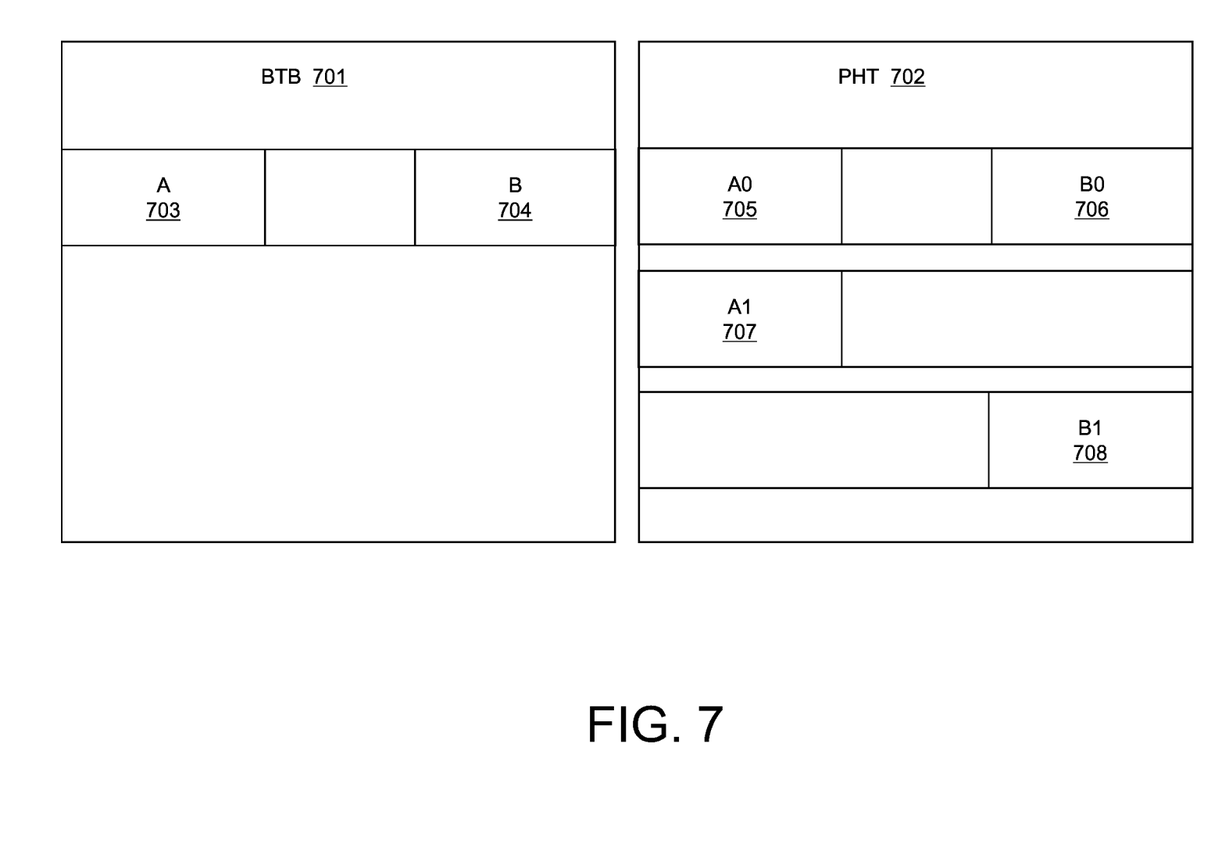
FIG. 7 depicts an example of a BTB and a multi-way PHT indexed by a GPV in accordance with an embodiment.

FIG. 7 depicts an example of a BTB 701 and a PHT 702 that are indexed by a GPV in accordance with an embodiment. In the example of FIG. 7, branch instruction A and branch instruction B are correlated, i.e., if A is taken, then B is also taken, whereas if A is not taken, then B is also not taken. Branch A has a corresponding entry 703 in BTB 701, which is indexed in BTB 701 based on the instruction address of branch A, and contains a target address for branch A. Branch B also has a corresponding entry 704 in BTB 701, which is indexed in BTB 701 based on the instruction address of branch B, and contains a target address for branch B. Instruction addresses for branches A and B are indexed into the same BTB row. There are also entries corresponding to branches A and B in PHT 702, e.g., A0 entry 705, B0 entry 706, A1 entry 707, and B1 entry 708. A0 and B0 correspond to execution of A and B when they are not taken, and A1 and B1 correspond to execution of A and B when they are taken. Branches A and B are both initially simultaneously predicted as not taken based on A0 entry 705 and B0 entry 706. When branch A is later predicated to be taken based on A1 entry 707, the GPV is updated based on the taken branch as described above with respect to FIG. 5, and the PHT is re-indexed based on the updated GPV. Branch B is then predicted taken based on B1 entry 708.

Technical effects and benefits include multiple simultaneous branch predictions in a processor.

Figure 8:
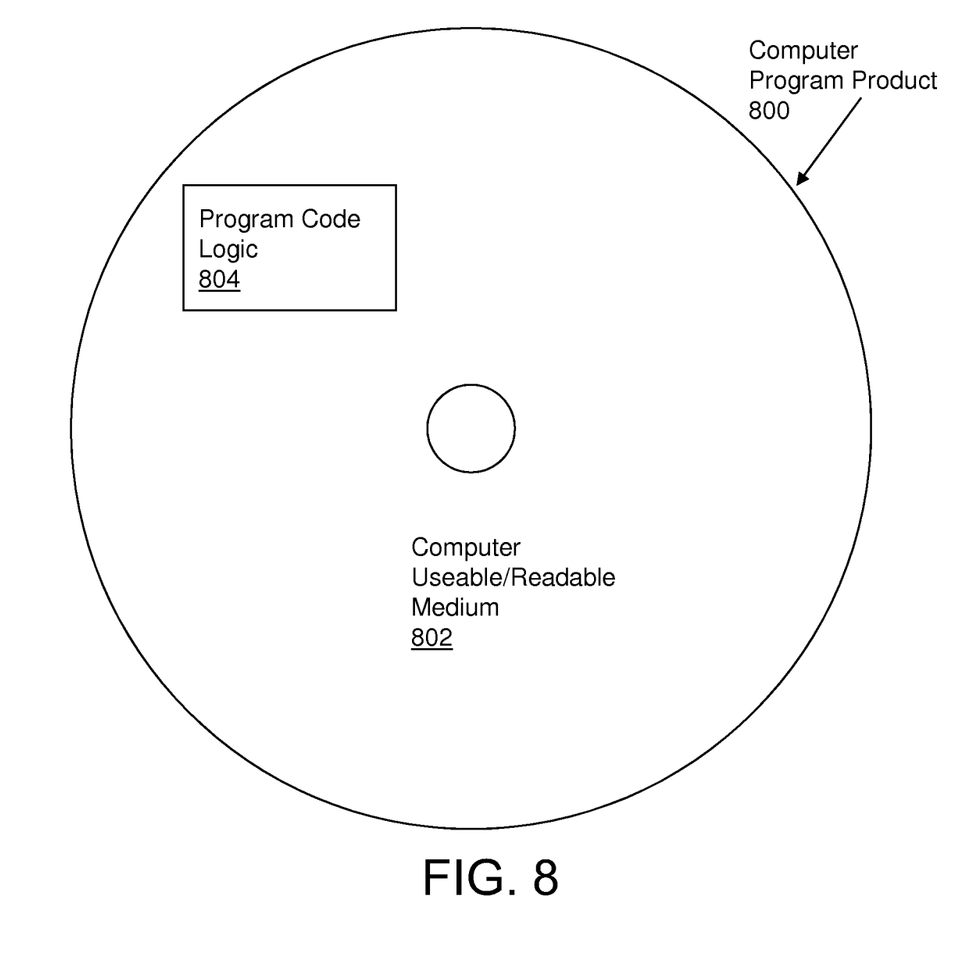
FIG. 8 depicts a computer-readable medium according to an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for branch prediction using a multi-way pattern history table (PHT) that is indexed using a global path vector (GPV), the system comprising:
    a memory; and
    a processor, communicatively coupled to said memory, the computer system configured to perform a method comprising:
        receiving a search address by a branch prediction logic that is in communication with the PHT and the GPV, wherein the branch prediction logic comprises a branch target buffer (BTB) and a plurality of hit detection modules that each determine a respective branch prediction,
            wherein a number N of the plurality of hit detection modules is equal to a number N of ways in the BTB, and wherein each of the plurality of hit detection modules receives an input from a single respective way in the BTB; and
            wherein the plurality of hit detection modules receives at least one input from the PHT;
        starting with the search address, simultaneously determining a plurality of branch predictions by the branch prediction logic based on the PHT and the BTB, wherein the plurality of branch predictions comprises one of: (i) N−1 not taken predictions and a single taken prediction, and (ii) N not taken predictions;
        providing the plurality of branch predictions to the processor; and
        updating the GPV by shifting an instruction identifier of a branch instruction associated with a taken prediction into the GPV, wherein the GPV is not updated based on any not taken prediction, and
            wherein the GPV is updated at prediction time to generate a PHT read index and at a completion time to generate a PHT write index.

2. The system of claim 1, further comprising inputting a target address of the branch instruction associated with the taken prediction into the branch prediction logic as the search address.

3. The system of claim 1, wherein shifting the instruction identifier of the branch instruction associated with the taken prediction into the GPV comprises inputting the instruction identifier into a history generator function configured to reduce a number of bits in the instruction identifier, and shifting the reduced number of bits into the GPV.

4. The system of claim 1, further comprising, based on a branch completion, updating the PHT based on the GPV by inputting a branch address of the branch instruction associated with the branch completion and a value stored in the GPV into an index generator, and updating the PHT based on an index that is output by the index generator.

5. The system of claim 1, wherein the PHT comprises an N-way PHT, and wherein each of the plurality of hit detection modules receives an input from a single respective way in the PHT.

6. The system of claim 1, wherein the PHT comprises an M-way PHT, and wherein each of the plurality of hit detection modules receives an input from each of the M ways in the PHT.

* * * * *